United States Patent [19]

Akamatsu

[11] 4,002,958

[45] Jan. 11, 1977

[54] AC OUTPUT POWER CONTROL SYSTEM

[75] Inventor: Masahiko Akamatsu, Amagasaki, Japan

[73] Assignee: Mitsubishi Denki Kabushiki Kaisha, Tokyo, Japan

[22] Filed: Dec. 11, 1974

[21] Appl. No.: 531,611

[30] Foreign Application Priority Data

Dec. 28, 1973  Japan .......................... 49-4056

[52] U.S. Cl. .............................. 318/227; 318/230; 318/231; 321/9 A

[51] Int. Cl.² .......................................... H02P 5/40

[58] Field of Search ................. 318/227, 230, 231; 321/9 A

[56] References Cited

UNITED STATES PATENTS

| 2,977,518 | 3/1961 | Kafka et al. ............... 321/9 A X |
| 3,573,601 | 4/1971 | Esser ........................... 321/9 A |
| 3,585,488 | 6/1971 | Gutt et al. ................... 321/9 A |
| 3,611,086 | 10/1971 | Mokrytzki et al. ........ 321/9 A |
| 3,614,590 | 10/1971 | Kernick ...................... 321/9 A |
| 3,649,902 | 3/1972 | Dunbar ....................... 321/9 A |
| 3,742,330 | 6/1973 | Hodges et al. .............. 321/9 A |

*Primary Examiner*—Gene Z. Rubinson
*Attorney, Agent, or Firm*—Oblon, Fisher, Spivak, McClelland & Maier

[57] ABSTRACT

An AC output power control system comprising turn-on means controlling at least three or three groups of switches operationally connected between a power source and a load in predetermined order, means for feeding power including at least an AC component from the power source to the load or regenerating it from the load to the power source, and means for selecting two or two groups of the switches among the switches in a predetermined order and for alternatively turning them on and off.

7 Claims, 15 Drawing Figures

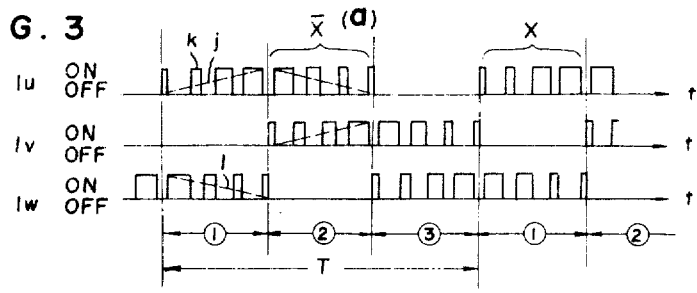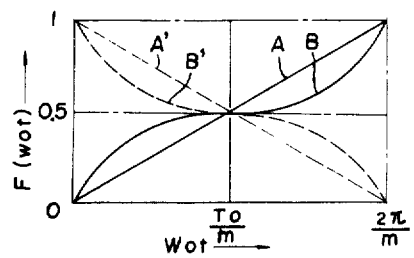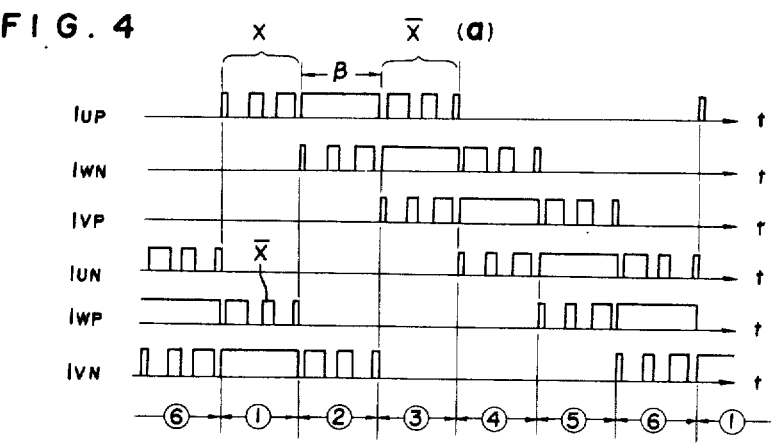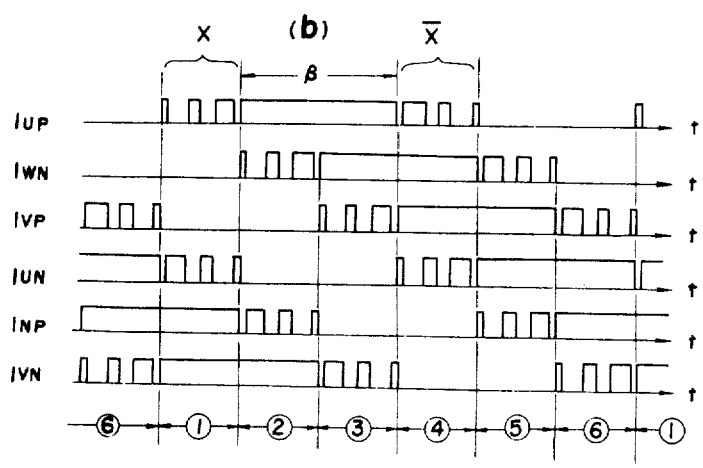

F I G. 5
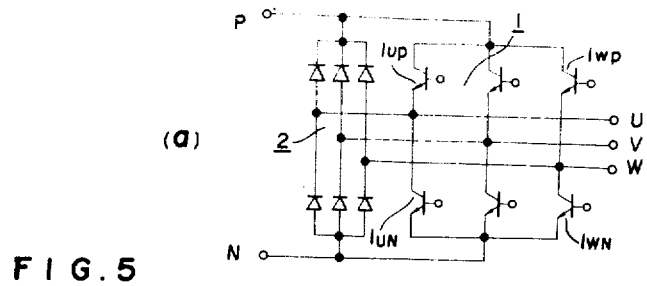
(a)
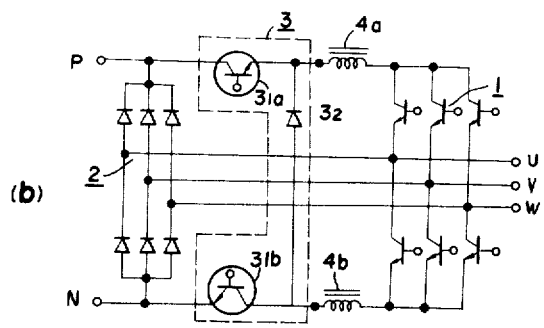
(b)
F I G. 6
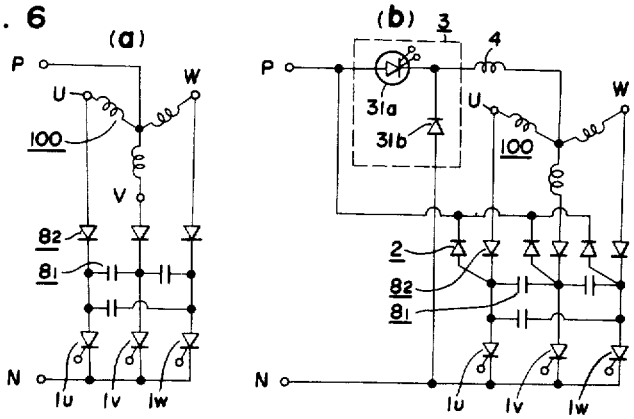
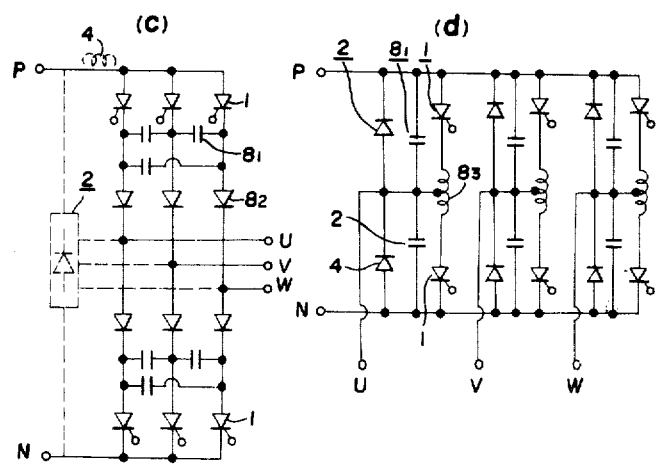

FIG. 7
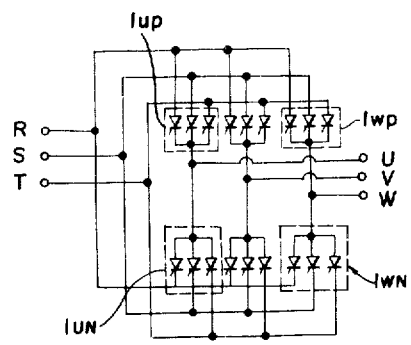
FIG. 8
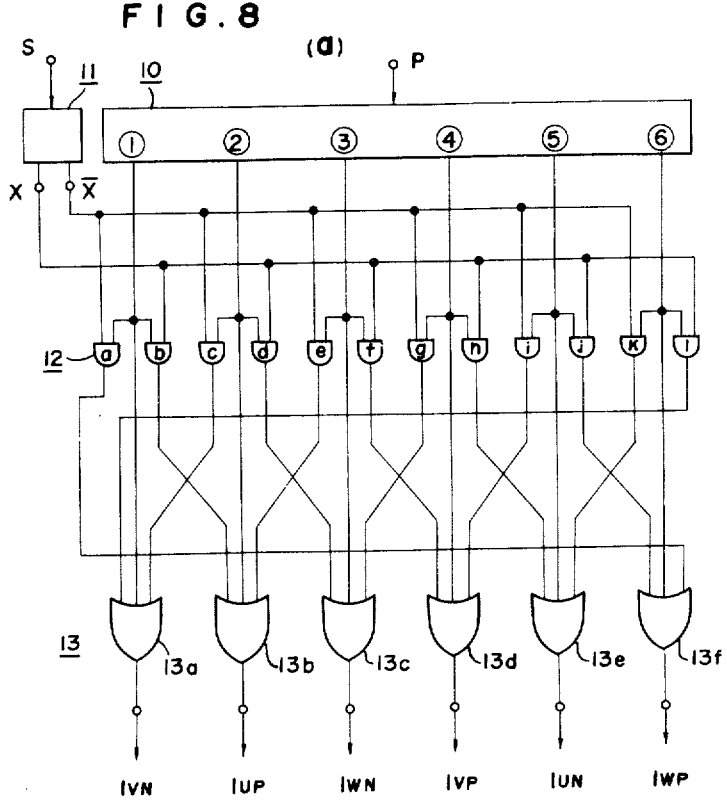
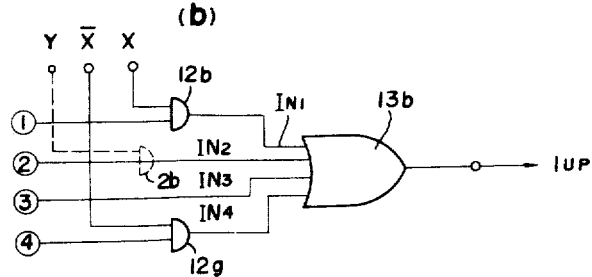

FIG. 9
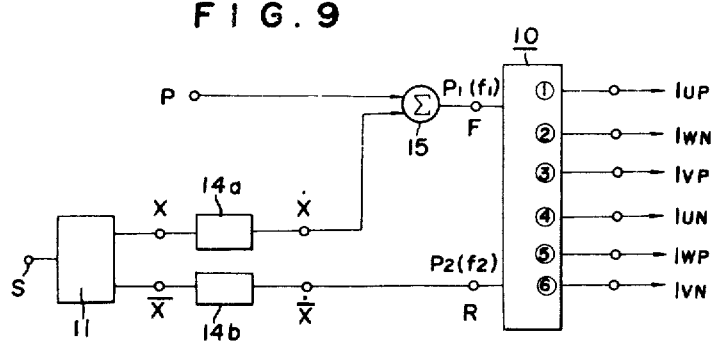
FIG. 10
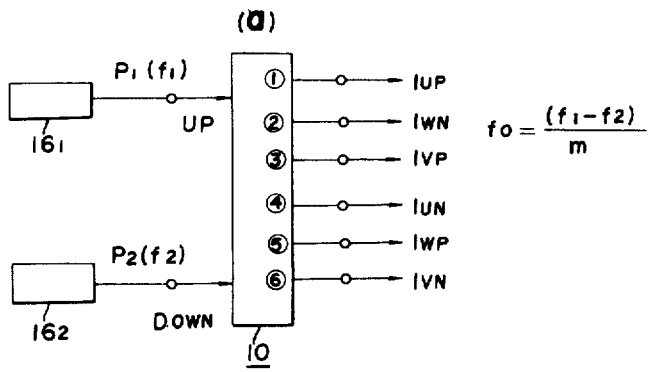
$$f_o = \frac{(f_1 - f_2)}{m}$$
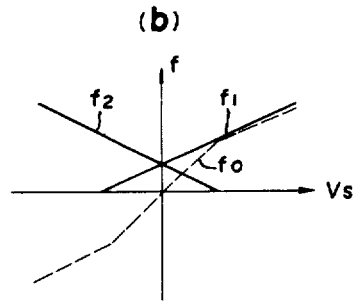
FIG. 12
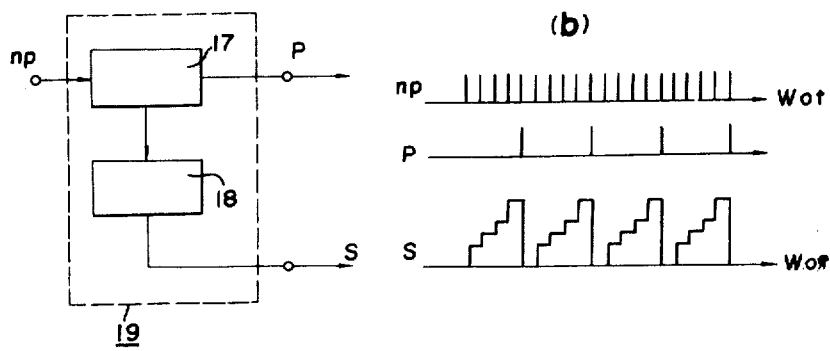

FIG. 11
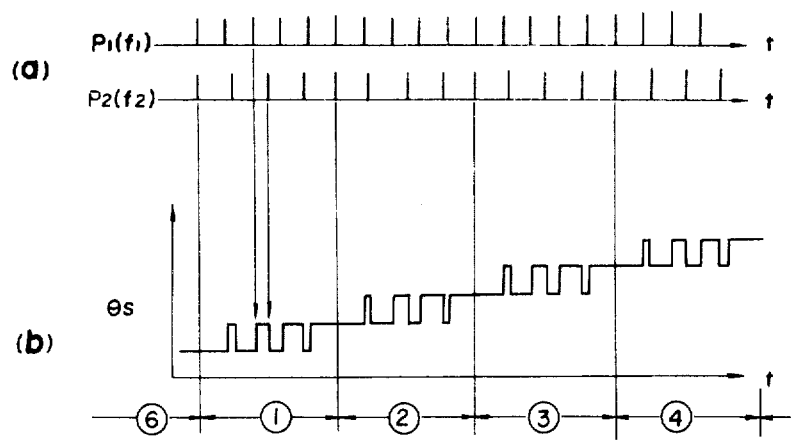
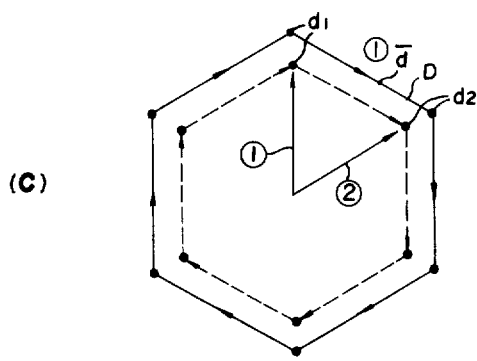
FIG. 13
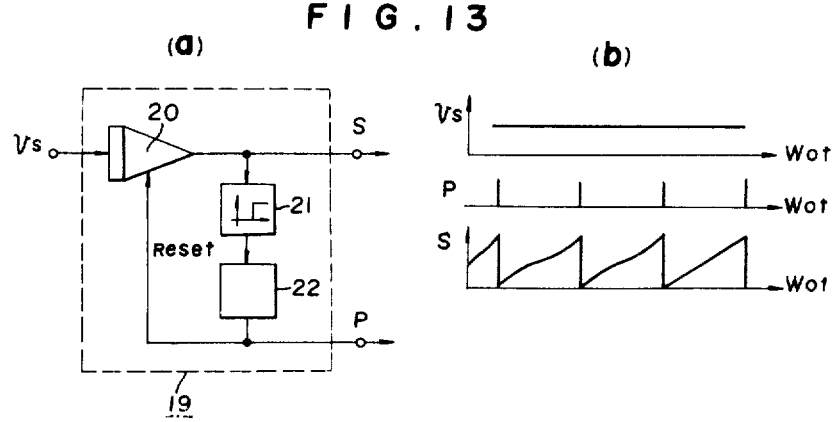

AC OUTPUT POWER CONTROL SYSTEM

BACKGROUND OF THE INVENTION

1. Field of the Invention

The present invention relates to an improved AC output power control system using solid state switches such as an inverter or a cyclo-converter wherein two groups of solid state switches are selected from at least three or three groups of solid state switches are alternatively turned on and off and the two groups are selected in predetermined order for the periods whereby low order harmonics are decreased and a stepless variable frequency control is attained.

The present invention relates to an improved AC output power control system using solid state switches such as an inverter or a cyclo-converter wherein the output current in the overlapping period is controlled and the current increase and decrease rate is controlled so as to decrease the low order harmonics.

2. Description of the Prior Art

FIGS. 1(a), (b), (c) are diagrams of typical embodiments of the AC output circuits using solid state switches 1 wherein solid state switches $1u - 1w$ or $1up - 1wn$ are operationally connected between a load 100 and a DC power source $200_1$ or an AC power source $200_2$.

FIG. 1a shows a three-phase half-wave inverter; FIG. 1b shows a three-phase bridge type inverter; FIG. 1c shows a three-phase half-wave cyclo-converter.

Taking the embodiment of FIG. 1a, in the conventional system, the switches $1u - 1w$ are respectively turn-on controlled as shown in FIG. 2. In the conventional turn-on control for the drive of an AC motor, a rotation of the magnetic field in the low speed and low frequency output region is in step state and the torque pulsation is high and a smooth rotation is difficult to attain. In the constant frequency AC output feed, with a conventional control system, the low order harmonics are high and the required capacity for a filter is high. In synchronous motor drive such as a stepping motor, there is a step rotation and it is difficult to provide middle stop points. On the other hand, it has been known to use a control system for modulating based on a standard sine wave or on a sine wave approximate step wave. However, the control device is disadvantageously complicated. In the case of an inverter, the commutation frequency (switching frequency) is increased so as to increase the loss and the switching elements and auxiliary devices are expensively complicated. In the case of a thyristor invertor, it has been necessary to employ an expensive extinction system for high frequency such as a one using a commutation auxiliary thyristor. It has been impossible to employ a simple interphase commutation system shown in FIGS. 6a, 6b, 6c, because of the principle of modulation. The simple extinction system for low frequency shown in FIG. 6d has not been used in practice because of the increase of loss. The conventional variable frequency drive system can not be applied for fine control of a numeral control apparatus, etc. A low inertia DC motor for this purpose is expensive and, especially, a direct driving low speed-high torque DC servomotor.

SUMMARY OF THE INVENTION

The present invention is to overcome the disadvantages of the conventional apparatus and is to provide a simple system for decreasing AC output low order harmonics.

Another object of the invention is to provide a simple control system for imparting smooth low speed rotation of an AC motor including a stepping motor.

A further object of the invention is to provide a control system for imparting smooth low speed rotation and a stepless rotary angle of a synchronous motor including a stepping motor.

A yet further object of the invention is to provide an economical cage induction motor type servo-mechanism for utilizing to a high accuracy a servo-mechanism such as a numeral control apparatus.

A still further object of the invention is to provide a low speed high torque AC frequency control servo-mechanism for a direct driving servo-mechanism.

The foregoing and other objects are attained in accordance with one aspect of the present invention through the provision of an AC output power control system comprising turn-on means controlling at least three or three groups of switches operationally connected between a power source and a load in predetermined order, means for feeding power including at least an AC component from the power source to the load or regenerating it from the load to the power source, and means for selecting two or two groups of the switches among the switches in a predetermined order and for alternatively turning them on and off.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIGS. 3a, 3b are diagrams for illustrating operations of the control system of the invention;

FIGS. 4a, 4b are diagrams for illustrating the other operations of the control system of the invention;

FIGS. 5a, 5b, 6a, 6b, 6c, 6d and 7 are respectively diagrams of AC output control switch circuits employed in the emobodiments of the invention;

FIGS. 8a, 8b are diagrams of embodiments of important part control devices of the control system of the invention;

FIGS. 9 and 10a are diagrams of the other embodiments of important part control devices of the control system of the invention;

FIG. 10b is a graph showing the relation of $f_1$ and $f_2$ to a speed command;

FIGS. 11a, 11b, 11c are diagrams for illustrating operations of the embodiment of FIG. 10;

FIGS. 12a, 12b and 13a, 13b are diagrams of the other embodiments of command control parts for the control system of the invention;

DETAILED DESCRIPTION OF THE PREFERRED EMBODIMENTS

Figure 1:
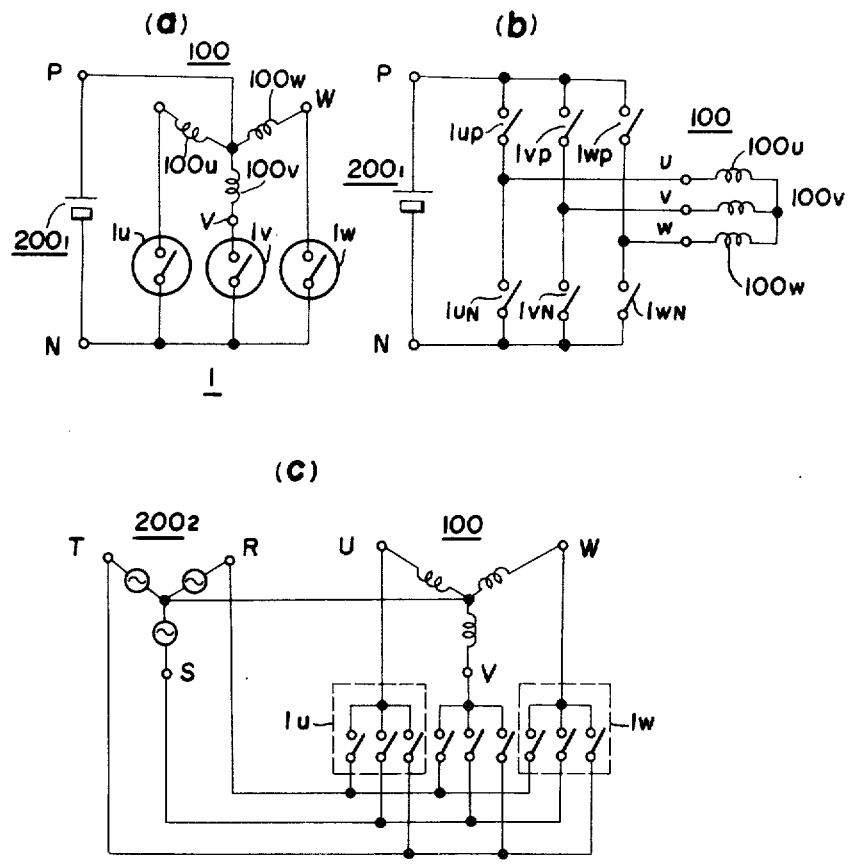
FIGS. 1a, 1b, 1c are diagrams of basic main circuits of an AC output control circuit according to the invention used for the invention.
Figure 2:
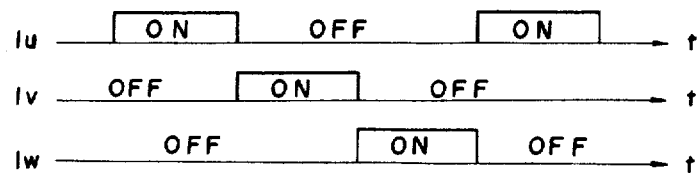
FIG. 2 is a diagram for showing conventional operation.

Referring now to the drawings, wherein like reference numerals designate identical or corresponding parts throughout the several views, and more particularly to FIG. 3 thereof, FIG. 3a is a diagram for the operation of the embodiment of the control system of the invention shown in FIG. 1a which is compared to that of the conventional one shown in FIG. 2. In the period ①, the switch 1u and 1w are alternatively controlled to turn on and off. When the switch 1u is in the ON state, the switch 1w is in the OFF state. When the switch 1u is in the OFF state, the switch 1w is in the ON state. Accordingly, the composed value in both of the ON periods is constant during all of the period ①. On the other hand, the ON duty ratio is differntially changed depending upon the time t (or the output frequency electrical angle $\omega_o t$). This can be given by the following equations $$\alpha 1u = \frac{t_{on\ 1u}}{t_{on\ 1u} + t_{off\ 1u}} = F(\omega_o t)$$

$$\alpha 1w = \frac{t_{on\ 1w}}{t_{on\ 1w} + t_{off\ 1w}} = K - F(\omega_o t)$$

(1)

wherein
 $\alpha 1u$ : ON duty ratio of the switch 1u;
 $\alpha 1w$ : ON duty ratio of the switch 1w;
 $K$ : constant, preferably $K \approx 1$;
 $F(\omega_o t)$ : modulation function.

For example, the modulation function is given by equation;

$$\alpha 1u = F_A(\omega_o t) = \frac{m}{2\pi} \omega_o t \qquad (2a)$$

wherein
 $m$ : a steps sectional in one period;
 $m = 2$ or 6 in FIG. 1a
 $m = 6$ or 12 in FIG. 1b
 $m = 3$ or 6 in FIG. 1c;
 $t$ : zero of initiation of the period ①,
or $$\alpha 1u = F_B(\omega_o t) = \frac{\sin \omega_o t}{\cos\left(-\frac{\pi}{m} + \omega_o t\right)} \cdot \frac{1}{2 \sin \frac{\pi}{m}} \qquad (2b).$$

The value of the modulation function $F_A(\omega_o t)$ and $F_B(\omega_o t)$ can be shown by the linear line A or the curve B of FIG. 3b wherein the abscissa m of the electrical angle shows a step sectional numeral in one cycle. The value m is determined depending upon the switch circuit and desirable sectional multiples.

For example, in FIG. 1a, $m = 3,6 \ldots$; in FIG. 1b, $m = 6,12 \ldots$; in FIG. 1c, $m = 3,6 \ldots$; FIG. 5 is the same as FIG. 1b; in FIGS. 6a, 6b, $m = 3$; in FIGS. 6c, 6d, $m = 6$. In certain cases, the multiple can be given for m. However, when the ON-OFF of the switch is dependent upon the ON-OFF of the other switch, the multiple cannot be given. The multiple can be given only when the ON-OFF of the switch is independently given. In principle, it is possible to give a non-integer multiple, but in practice, only an integer multiple is given.

The curve A of FIG. 3b is determined by converting the ON duty ratio in linear to the progress of the output frequency electrical angle $\omega_o t$ and is relatively simple. The curve B of FIG. 3b shows that a rate of increase of the ON duty ratio is high in both the initial period and the final period and is an example of correcting the revolution of a rotating field to be constant in an AC motor drive, etc. This is especially suitable for a control system of an AC output power for imparting a smooth AC motor drive. The corrected curve B approaches the linear line A depending upon the increase of m. In practical operaton, the curve can be a linear line. The output frequency electrical angle $\omega_o t$ is given as a command signal. This will be illustrated in greater detail hereinafter.

One alternative ON-OFF control system between a pair of switches has been illustrated by the example of the period ① of FIG. 3a. Likewise, in the period ②, the switches 1u and 1v are alternatively controlled to turn on and off and in the period ③, the switches 1v and 1w are alternatively controlled to turn on and off. The operations are repeated. In the period ① of the switch 1u of FIG. 3a, a mean value or average value j of the ON-OFF rectangular wave k is given by the waveform of the curve A or B of FIG. 3b. On the other hand, in the period ① of the switch 1w, the mean value curve l of FIG. 3a is changed to the differential curve A' or B' of FIG. 3b. Accordingly, the mean value of voltage applied to the loads 100u, 100w or feed current is changed under the differential relationship shown by the curve A or B and the curve A' or B' of FIG. 3b.

In accordance with the invention, a pair of switches changing to OFF state and a switch changing to the ON state is formed and the transition process is controlled by the ON duty ratio differential control whereby the transistion of effective load current (commutation, mean transit) is smoothly performed. Accordingly, the low order harmonics of the AC output are decreased.

When the control system is applied to the drive of an AC motor, the revolution of the rotating magnetic field (or moving field) becomes smooth so as to attain smooth rotation. When the command is stopped at a predetermined phase $\omega_o t$, the switching operation continues at the ON-OFF duty ratio corresponding to $\omega_o t$. Accordingly, the magnetic axis of the rotating field (an electro-magnetic balanced point of a synchronous motor such as a stepping motor) is stopped at a desirable middle point corresponding to $\omega_o t$, whereby the stepless control of the AC motor is attained. Moreover, a pair of switches are alternatively switched to turn on and off. Accordingly, it is possible to use a dependent switch which is turned off depending upon the turn-on operation of the other switch. For example, interphase commutating thyristor switches can be used as shown in FIGS. 6a, 6b, 6c and the main circuit can be simplified. On the contrary, in the conventional high frequency pulse width modulation system, it is necessary to use a switch circuit wherein each phase is independently switched to turn on and off.

The control system of the three phase bridge circuit of FIG. 1b will be illustrated. A diagram of the ON-OFF operation of the switches 1up - 1vn is shown in FIG. 4. In Figure FIG. 4a, the fixed ON period (non-modulation period) $\beta$ is 1/6 period. In FIG. 4b, the fixed ON period $\beta$ is 2/6 period. In accordance with the control system of FIG. 4a, each pair of switches, i.e., a pair of 1up and 1wp in the period ①; a pair of 1wn and 1vn in the period ②; a pair of 1vp and 1up in the period ③; a pair of 1un and 1wn in the period ④; a pair of 1wp and 1vp in the period ⑤; and a pair of 1vn and 1un in the period ⑥ is alternatively switched to turn on and off.

The characteristics of the control system in comparison to the conventional system are the same as those of the case shown in FIG. 3 in that the alternative ON-OFF control is given between one pair of switches and each pair of switches which are alternatively switched to turn on and off are respectively classified in a positive group (having a symbol $p$) or in a negative group (having a symbol $n$). Accordingly, the interphase commutating system shown in FIG. 6c can be attained though it could not be attained by a conventional high frequency pulse width modulation system.

In the control system of FIG. 4b, each pair of switches, i.e., a pair of 1up and 1un in the period ①; a pair of 1wn and 1wp in the period ②; a pair of 1vp and 1vn in the period ③..., is alternatively switched to turn on and off. The characteristics of the system are the alternative ON-OFF control of a positive switch (having a symbol p) and a negative switch (having a symbol n) which have the same phase. Since the turn-on period is long, it is effectively utilized.

As shown in FIG. 6d, the alternative ON-OFF control in one phase can be used. As shown in FIG. 5a, 5b and FIG. 7, it is possible to employ any control system of switch circuits which can be independently switched to turn on and off.

The characteristics of the control system of the invention are remarkable in the case of the polyphase bridge type shown in FIG. 4. The fixed ON period (non-modulation period) $\beta$ is given. The characteristics of the embodiment are to attain the object of the invention. The alternative ON-OFF control is performed between a pair of switches which sequentially change current (commutation) even in the period corresponding to the commutation overlapping period in the conventional system. Accordingly, in comparison with the conventional high frequency modulation system, the control system does not have a function for controlling total AC output (mean AC output voltage or mean output current). The first object of the conventional pulse width modulation control system is to control the total AC output (voltage or current). On the contrary, the first object of the control system of the invention is to control the commutation whereby the harmonics are decreased and smooth control of the AC motor is attained. In the control system of the invention, the control of total output should be carried out by another system such as a system for variable power voltage or current and a system for composing a voltage control modulation ON-OFF signal. The former is the main circuit system shown in FIG. 5b and FIG. 6b. The latter is the system for independently controlling only the switch in the fixed on-state period $\beta$ by a separate ON-OFF duty ratio control manner.

In the latter system, the period for commutation overlap control (an alternative ON-OFF control of a pair of switches) is completely separated from the period for ON-OFF control of the total output-value-control period $\beta$, and is independently performed. Accordingly, the control circuit can be remarkably simplified. This will be described in greater detail hereinafter.

The principles of the invention have been illustrated referring to FIGS. 1–4. The detail of the embodiments will now be explained. FIGS. 5–7 are diagrams of certain embodiments of main switch circuits controlled by the control system of the invention. FIG. 5a is a diagram of a three phase bridge connection circuit having a rectifier 2 composed of transistors. FIG. 5b is a diagram of a transistor switch circuit having a chopper control device 3 for total output current control (or voltage control).

FIG. 6a is a diagram of a three phase half-wave circuit having thyristors wherein the reference numeral $8_1$ designates an extinction capacitor; $8_2$ designates a series diode for improving the extinction; and 4 designates a DC reactor. FIG. 6b is a diagram of a three phase half-wave circuit having a thyristor chopper control device 3 for total ouput current control and rectifiers 2. FIG. 6c is a diagram of an interphase commutating thyristor bridge inverter circuit such as a current rectangular waveform inverter having a DC reactor 4 (shown by the dotted line) or a voltage rectangular waveform inverter having a feedback rectifier 2 (shown by the dotted line). FIG. 6d is a diagram of a three-phase bridge inverter circuit of a voltage rectangular waveform interphase mutual commutating system.

FIG. 7 is a diagram of a cylo-converter circuit wherein a group of three thyristors for one directional component is connected between each phase of the AC power source and one phase of the output (shown by the dotted line) corresponds to one switch of the bridge type inverter. The ON-OFF signal shown in FIG. 4 for one output frequency is applied to one group and the ON signal is allocated to each thyristor in one group under the logical product of the ON-OFF signal and the second signal corresponding to each phase of the power source. The control circuit for generating the ON-OFF signal applied to each switch in the main switch circuit will now be explained.

In the following embodiment a typical example corresponding to a three-phase bridge connection having steps in one period $m=6$ will be illustrated. FIG. 8a is a diagram of the control device corresponding to that of FIG. 4a. In FIG. 8a, the reference numeral 10 designates a first turn-on signal allocater having ring counters which give an allocating command from the pulse line input P. In the embodiment, the turn-on signal having the ON command period of 1/6 period and the phase difference of 1/6 period is applied sequentially to each output terminal ① – ⑥. It is possible to employ the other output type allocater in the control system of the invention. In FIG. 8a, the reference numeral 11 designates a pulse width modulator wherein the transit overlap control signal S is the input for the ON-OFF duty ratio control (the input signal S corresponds to the command $\omega_o t$ of FIG. 3b and the signals X, $\overline{X}$ ($\overline{X}$ is reverse to X) having the ON duty ratio $\alpha$ corresponding to $F(\omega_o t)$ in the ordinate are the output). When the output X corresponds to the curves A and B of FIG. 3b, the output $\overline{X}$ corresponds to the curves A' and B'. In the detailed operation of the periodical shift, the ON-OFF state shift of the switch 1up in the period ① shown in FIG. 4a corresponds to the output signal X and ON-OFF state shift of the switch 1wp in the period 1 corresponds to the output signal $\overline{X}$. The pattern is repeated 6 times per one period of period ① ~ ⑥ (output frequency 1 cycle). In general, the generation of the signal which results from the pusle width modulation by the curve pattern of FIG. 3b per each electrical angle $2\pi/m$ to the progress of the output frequency electrical angle $\omega_o t$ corresponding to said steps $m$, is repeated.

In FIG. 8a, the references 12a–b designate logical product elements; 13a–13f designate logical addition elements and the outputs are respectively the ON-OFF signals to the switches 1vn–1wp to generate the waverform of FIG. 4a. The operation in the period ① will now be explained. Only the output terminal ① of the allocater 10 is in the ON command state. The other teminals are in the OFF command state. Accordingly, the logical addition element 13a generates the ON command regardless of the pulse width modulated signals X, X̄. On the other hand, the logical product elements 12a, 12b generate the pulse width modulated signals X, X̄. Accordingly, the logical addition element 13b generates the pulse width modulated signal X and the logical addition element 13f generates the pulse width modulated signal X̄. Accordingly, the state corresponds to that in the period ① of FIG. 4a. Likewise, in the periods ①–⑥, the fixed ON signal β and the pulse width modulated signals X, X̄ are sequentially allocated to the switches to repeat the pattern of FIG. 4a.

FIG. 8b is a diagram of one embodiment wherein the fixed ON signal period β (illustrated by referring to FIG. 4b) is 2/6 period. The connection of the logical addition element 13 to only one switch 1up is shown in the case of the connection of the pulse width modulator 11 and the allocater 10 as shown in FIG. 8a. The other switches are connected so as to sequentially repeat the operation. It is also possible to employ various other types such as one having the ON command period of 2/6 period; and one having the ON command period of 5/12 period as the first turn-on signal allocater 10 in FIG. 8a.

FIG. 9 is a diagram of another embodiment of the control device in the control system of the invention. Incidentally, in FIGS. 3, 4 and 8, the transistion of the pulse width modulated signal X̄ to the ON state means the progress of the phase of the AC output. The transition of the pulse width modulated signal X to the OFF state means the retrogress of the phase of the output. Accordingly, it means the repeat of the progress and retrogress shift to the basic progress direction for the sequential turn-on state change of switches.

FIG. 9 is a diagram of the embodiment controlled at the input side of the allocater 10 under this principle. In FIG. 9, the pulse width modulated output signals X, X̄ are respectively differentitated to give $\dot{X}$, $\dot{\overline{X}}$ through the pulse shaping elements 14a, 14b; $\dot{X}$ means the progress and is applied to the pulse addition element 15 and to the progress shift input terminal F of the allocater 10. $\dot{\overline{X}}$ means the retrogress and is applied to the retrogress shift terminal R of the allotter 10. $\dot{X}$ and $\dot{\overline{X}}$ are the same number and the integrated value of $\dot{X}$ and $\dot{\overline{X}}$ is zero.

The progress state duty ratio increases depending upon the output frequency phase progress ($\omega_o t$), that is the commutation overlap control signal S. When the progress state period that is the ON command period of the pulse width modulated signal X is maximum, the main step pulse is applied to the progress input terminal F and the ON duty ratio of the pulse width modulated signal X is returned to a minimum value. As a result, the electrical angle $\theta_s$ (instantaneous value) corresponding to the hysteresis of the allocater (ring counter) is shifted as shown in FIG. 11b, and the mean value of the electrical angle is continuously changed.

FIG. 10a is a diagram of another embodiment of a control device in the control system of the invention. In the embodiment of FIG. 9, $P_1$ designates the progress shift pulse train as the addition of the main step pulse P and the pulse width modulation progress pulse $\dot{X}$ and $P_2$ designates the retrogress pulse line corresponding to $\dot{\overline{X}}$ $f_1, f_2$ designate the pulse frequencies. The allocater 10 is generally shifted at the rate of frequency $f_1 - f_2$ corresponding to the differential frequency.

The embodiment of FIG. 10 is based on this principle and comprises a pulse generator $16_1$ for generating a first pulse train $P_1$ having pulse frequency $f_1$ and a pulse generator $16_2$ for generating a second pulse line $P_2$ having a pulse frequency $f_2$. The output basic frequency corresponds to the steps $m$ of the allocater ring counter to give $f_o = (f_1 - f_2)/m$.

The operation is shown in FIG. 11. FIG. 11a shows the first pulse train $P_1(f_1)$ and the second pulse train $P_2(f_2)$. The progress of the hysteresis $\theta_s$ of the allocater is shown in FIG. 11b. FIG. 10b shows the interphase shift of $f_1$ and $f_2$ to the speed command $V_s$ in the case of variable frequency control. The progress of the turn-on state order of the switch 1 corresponding to the hysteresis of FIG. 11b is the same as that of FIG. 8. The ON-OFF operation of the switches are the same as that of FIG. 4a or FIG. 4b.

In FIGS. 9 and 10, in the case of 2 of the ON command output number of the allocater 10 at the same time, the operation is as shown in FIG. 4a. In the case of 3 of the ON command output number, the operation is as shown in FIG. 4b. That is, the number of switches in the ON state at the same time is 2 in FIG. 4a and 3 in FIG. 4b.

The rotating magnetic field vector trace when the AC motor is driven by using the control devices of FIGS. 8–10 under the control operation of FIG. 4 is shown in FIG. 11c. In accordance with the invention, the trace is continuously rotated on the full line. It is shifted on the trace zone D in the period ① as its mean value under the pulse width modulation. That is, the mean point $\overline{d}$ is continuously shifted in the D zone by the control of the duty ratio of the period in the progress point $d_2$ (the ON period of the pulse width modulated signal X) to the period in the retrogress point $d_1$ (the OFF period of the pulse width modulation signal X) $\alpha = t_{on}/(t_{on} = t_{off})$. The shift of the magnetic field does not instantaneously follow the instantaneous change of voltage in practical operation. Accordingly, the progress point $d_2$ and the retrogress point $d_1$ approach the near mean point $\overline{d}$. On the contrary, in the conventional system, as shown by the dotted line, it is at the $d_1$ point during the period ① and at the $d_2$ point during the period ② and it passes the middle part for a short time. As is clear from the illustration, in accordance with the invention, the rotation of the magnetic field can be continuous and can be stopped at a desirable position. Accordingly, it is possible to attain smooth rotation of the motor, stepless control and a desirable step control of the synchronous motor including a pulse motor.

The generators for generating the main pulse P and the transit overlap control signal S which are applied to the control devices of FIGS. 8 and 9, i.e., the control command control part 19, will now be described in detail. FIG. 12a shows one embodiment of a digital command system and FIG. 12b shows waveforms in the operation. In FIG. 12a, the reference $np$ designates a command pulse train; 17 designates a ring counter and the main pulse output P corresponds to the figure progress pulse which can be a pulse train frequency divider. 18 designates a D/A converter for converting the counter and state value in the divided period to an analogue electrical signal. The output S is a transit overlap control signal. The signal S is reset during each time of the output of the main pulse P whereby the pattern of the curves A and B of FIG. 3b is repeated.

FIG. 13a shows one embodiment of an analogue command system composed of an integration device 20 for integrating the speed command input $V_s$; a comparator functional element 21 for generating the pulse P when the output reaches a predetermined level; and a pulse generator 22 (unistable multivibrator). The integration device 20 is reset by the pulse generation. The output of the integration device can be used as the transit overlap control signal S and the pulse output can be used as the main pulse train P. The command control part 19 forms the voltage frequency converter (V/F converter) whereby the main pulse P and the transit overlap control signal S having a frequency proportional to the command input $V_s$ as shown in FIG. 13b are generated. The command control systems corresponding to the embodiments of FIGS. 8 - 10 can also be secured by a combination of various V/F converters; a combination of a frequency divider and a counter and the combination of a frequency divider and a flip-flop as the analogue or digital electro-circuit.

Figure 14:
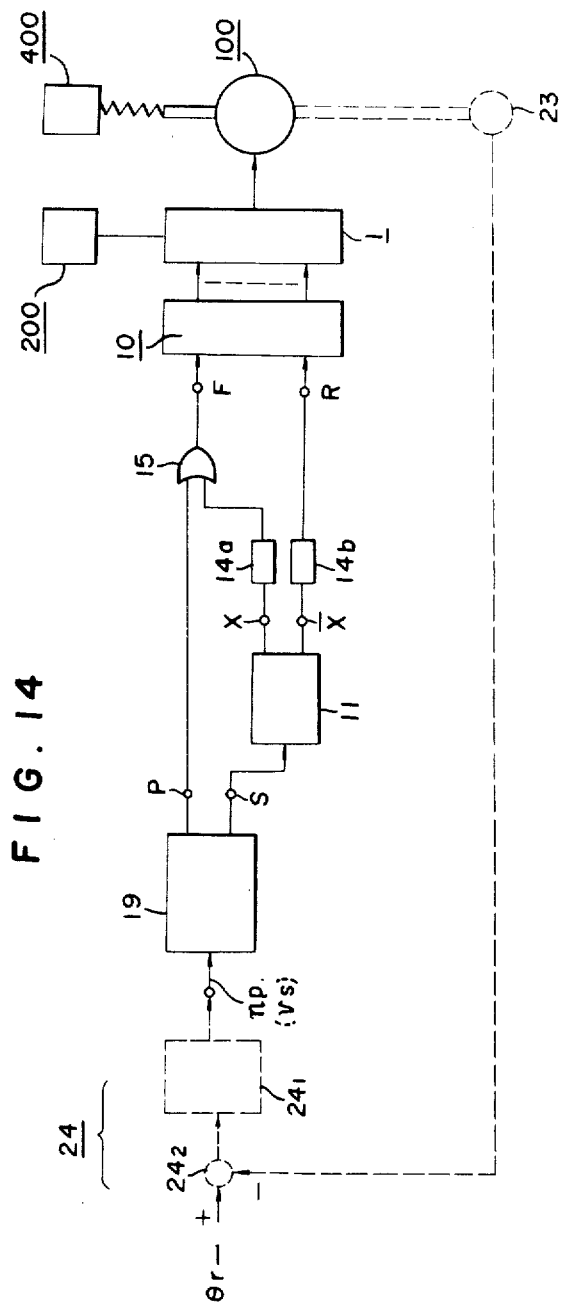
FIG. 14 is a diagram of one embodiment of a control device for an AC motor according to the invention.

FIG. 14 shows one application of the invention as a control system for an AC motor. In FIG. 14, the reference 1 designates a solid state switch circuit; 200 designates a power source; 100 designates an AC motor (induction motor; synchronous motor including pulse motor); and 400 designates a load. The speed command is input as a digital pulse ($np$) or analogue ($V_s$). In the case of position control, the elements shown by the dotted line are connected or the synchronous motor is used as the Ac motor. When an induction motor is used, it is preferable to connect a reference operation amplifier 24 which generates an error amplified output by comparing the output of a rotary angle detector 23 or a position detector 23 to the reference position $\theta_r$. In this case, the reference operation output can be an analogue signal $V_s$ or a digital pulse train $np$. The command control part 19 can be the command control device of FIG. 12.

When the synchronous motor having a high resolution of rotary angle comparison to number of poles of the synchronous motor is used, a similar consideration is applicable. When the number of poles of the synchronous motor corresponds to the resolution of the rotary angle, it is unnecessary to connect the elements shown by the dotted line. The embodiment of FIG. 14 can effectively be used for the highly accruate control of position in a number control machine tool and a robot. A stepping motor and a DC motor have been used for such purpose. However, these motors have complicated structures and are expensive. It has been required to drive directly a machine without reduction gear. For this purpose, a motor having low speed and high torque is required. However, when the conventional stepping motor or low inertia DC motor is used, a larger and expensive motor is disadvantageously required. A stepping motor gives low torque by the use of the same rotor as an inductor. The low inertia DC motor has a smooth armature structure so that the effective field magnetic flux density is low and the torque generated by the rotor is low. That is, a large and expensive motor is required.

On the contrary, in accordance with the invention, it is possible to generate a continuous and smooth torque even in the low speed region by using a cage induction motor whereby a smoothness similar to that of a DC motor can be realized. On the other hand, the structure can be simple and high torque can be used to yield a compact structure. In accordance with the invention, it is possible to attain a servo-mechanism having high accuracy similar to that of a DC motor in a simple manner and to realize a compact and economical structure. The invention is especially effective for a direct connection drive servo-mechanism. It also finds use as industrial variable speed motors which can operate at quite low speed. Accordingly, the speed control range is remarkably increased.

In the conventional variable frequency drive, it has been usual to operate at 5 - 200 Hz and especially 5 - 10 Hz as the low frequency for imparting smooth operation. In accordance with the invention, smooth operation can be imparted by any frequency. Moreover, it is possible to impart a high speed operation of high frequency such as 3 KHz by the use of the simple inverter circuit system of FIG. 6c. The problem of limitation of the high speed range is substantially overcome, and the motor having a high speed range of $10^4 - 10^6$ can be attained. The limitation of the speed range is mainly caused by a main switch circuit, the motor and an inertia of load. In accordance with the invention, the limitation is overcome and is enlarged to the limitation of a command control circuit (electrocircuit and digital circuit).

Figure 15:
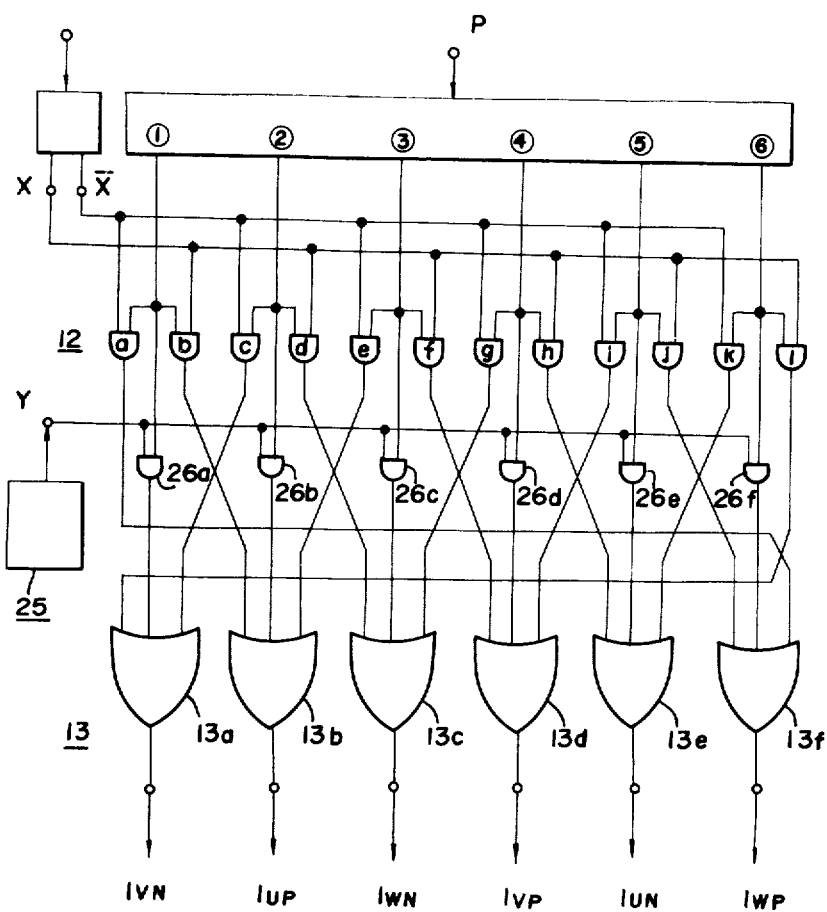
FIG. 15 is a diagram of another embodiment of an important part control device of the control system of the invention.

FIG. 15 illustrates another embodiment of the control device of the invention wherein a separate ON-OFF control is used during the fixed ON period $\beta$ whereby the total AC output voltage or current (fundamental wave effective value) can be controlled. In the embodiment of FIG. 15, the logical product elements $26a - 26f$ are inserted in the fixed ON signal line and a pulse width modulated signal generator 25 for total output control is connected in the embodiment of FIG. 8a. The pulse width modulated signal Y for output control can be any ON-OFF command and can be synchronized with the frequency control main pulse train P. There may be provided a second ON-OFF control signal generator for duty ratio control. Likewise, it is possible to insert a logical product element 26 in at least one of the input lines $IN_2$ and $IN_3$ of the logical addition element 13 to give a logical product of the total output control pulse width modulated signal (duty ratio control signal) in the embodiment of FIG. 8b. In order to decrease the generation of the modulated harmonics, the logical product element 26 is inserted in only one input line. This is shown by the dotted line in FIG. 8b. The total output control ON-OFF operation is given during the fixed ON period $\beta$ of FIG. 4b in the latter embodiment. The total output control ON-OFF operation is given during the fixed ON period $\beta$ of FIG. 4a in the emobodiment of FIG. 15.

The ON-OFF control is given during all of the periods in said embodiments. However, the modulation control period is completely separated and the modulation control is independently attained and the transit overlap control for decreasing harmonics and the total output control are attained under the time sharing operation. Accordingly, it is unnecessary to perform complicated modulation (relative modulation between triangular wave and sine approximate step wave; synchronous circuit thereof; switch of modulation frequency and synchronous switch) and the apparatus can be simplified. The generation of the reference sine wave is quite complicated and digital circuits and analogue addition devices are required even though the sine approximate step wave is generated. In the step approximation, the 11th and 13th harmonics are the lowest order harmonics. Accordingly, it is impossible to attain the low speed operation of the invention. That is, the conventional step approximate modulation can attain only 12 steps operation as it is referred to as steps per cycle. On the contrary, in accordance with the invention, 30 – 60 steps operation can be easily attained and the stepless operation can be attained in the analogue control system. The difference is remarkable and the invention contributes to the speed control range and the accuracy thereof. In the control of the synchronous motor, especially the stepping motor drive, the remarkable advantages of the speed control range and accuracy of the present invention are particularly noticeable.

In accordance with the invention, the alternative ON-OFF operation is used between a pair of switches to control the transit overlap of an AC output whereby the low order harmonics of an AC output can be decreased. Moreover, the stepless variable frequency control of an AC motor can be easily attained and the steps of a stepping motor can be increased. A smooth high accurate control which is superior to that of a DC motor can be attained by a cage induction motor. Moreover, a servo-mechanism suitable for driving a numeral control machine can be realized. A servo-mechanism having a simple and economical structure can be realized by employing a cage induction motor and is superior to a DC servo-motor in terms of characteristic structure, economics and maintenance. It is also possible to independently control the AC output control whereby control can be simplified.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A power control system for providing smooth transitions in effective load current by reducing low order AC harmonics, comprising;
   a plurality of electronic switch means for delivering power to a load,
   allocating circuit means coupled to said plurality of electronic switch means for turning said switch means on and off in a predetermined sequential order; and,
   duty cycle control means coupled to said allocating circuit means for varying the duty cycle of individual switching means of said plurality of switch means in response to the phase of said load, and
   said allocating circuit means together with said duty cycle control means operating to control said plurality of electronic switch means such that one of said electronic switch means is turned on for the same variable interval during which another of said electronic switch means is turned off, whereby low order AC harmonics are reduced.

2. A system as in claim 1, wherein said allocating circuit means comprises:
   a plurality of counting circuit means,
   a plurality of logical product elements coupled to said counting circuit means, said plurality of logical product elements equal in number to twice the number of said counting circuit means; and,
   a plurality of logical addition elements coupled to said counting circuit means and to said logical product elements, and equal in number to said number of counting circuit means.

3. A system as in claim 2, wherein said duty cycle control means comprises:
   pulse width modulator means coupled to said plurality of logical product elements.

4. A system as in claim 3, further comprising:
   a second plurality of logical product elements equal in number to said counting circuit means and coupled to said logical addition elements.

5. A system as in claim 4, further comprising:
   pulse width modulated signal generator coupled to said second plurality of logical product elements.

6. A system as in claim 1, further comprising:
   pulse differentiating means coupled to said duty cycle control means for differentiating the output thereof; and,
   said pulse differentiating means coupled to an input of said allocating circuit means.

7. A system as in claim 6 wherein:
   said pulse differentiating means includes two pulse differentiating circuits.

* * * * *